United States Patent [19]

Lance

[11] 3,810,046

[45] May 7, 1974

[54] MICROWAVE SOURCE

[75] Inventor: Drew R. Lance, Saratoga, Calif.

[73] Assignee: California Microwave Inc., Sunnyvale, Calif.

[22] Filed: Feb. 23, 1973

[21] Appl. No.: 335,316

[52] U.S. Cl. .......................... 332/19, 331/17, 332/18

[51] Int. Cl. .......................... H03c 3/00

[58] Field of Search .......................... 332/19, 18; 331/17

*Primary Examiner*—John Kominski

*Attorney, Agent, or Firm*—Schatzel & Hamrick

[57] ABSTRACT

A microwave source including a dual bandwidth phase lock loop and a circuit for developing a modulation cancelling signal for insertion into the loop to cancel any error signal modulation components. In the preferred embodiment the same modulating signal used to modulate the oscillator is shifted in phase by 90° and added to the output of the phase detector. Since the cancelling signal is then 180° out-of-phase with the error signal modulation component, complete cancellation is achieved leaving only the DC error signal for input to the adaptive control network which completes the loop.

11 Claims, 2 Drawing Figures

MICROWAVE SOURCE

BACKGROUND OF THE INVENTION

The present invention relates generally to microwave sources and more particularly to a microwave source including an improved dual bandwidth phase lock loop having means for removing modulation components from the control loop.

In my previously filed co-pending U.S. patent application, Ser. No. 304,136 entitled "Dual Bandwidth Phase Lock Loop," a dual bandwidth phase lock loop was disclosed wherein the bandwidth of the loop is automatically expanded when the magnitude of the loop error signal exceeds a predetermined threshold. Such apparatus provides ideal oscillator control for applications wherein little or no modulation is applied to the controlled oscillator. However, when considerable modulation is applied to the oscillator, the effect is to cause the loop to cause the loop to operate in the expanded bandwidth mode even though the loop stress threshold has not been reached. This of course reduces the efficiency of the loop and prohibits it from operating in the intended manner.

SUMMARY OF THE PRESENT INVENTION

It is therefore a primary object of the present invention to provide an improved microwave source wherein modulation applied to the controlled oscillator has no material effect upon the control function of a dual bandwidth phase lock loop used to control the oscillator.

Briefly, the present invention is directed to a dual bandwidth phase lock loop controlled microwave source in which the DC error signal output of a phase detector is coupled to the control input of a modulatable voltage controlled microwave oscillator through a particular type of voltage responsive adaptive signal translating circuit. A modulation component cancelling circuit is provided for developing a modulation cancelling component for input to the signal translating circuit so as to remove the modulation component from the error signal and thus prevent the translating circuit from malfunctioning due to the presence of the modulation component.

Among the advantages of the present invention over the prior art is that the dual bandwidth loop can function entirely independent of any modulation applied to the controlled oscillator.

Other objects and advantages of the present invention will no doubt become apparent to those of ordinary skill in the art after having read the following detailed description of a preferred embodiment which is shown in the several figures of the drawing.

IN THE DRAWING

DETAILED DESCRIPTION OF THE PREFERRED EMBODIMENT

Figure 1:
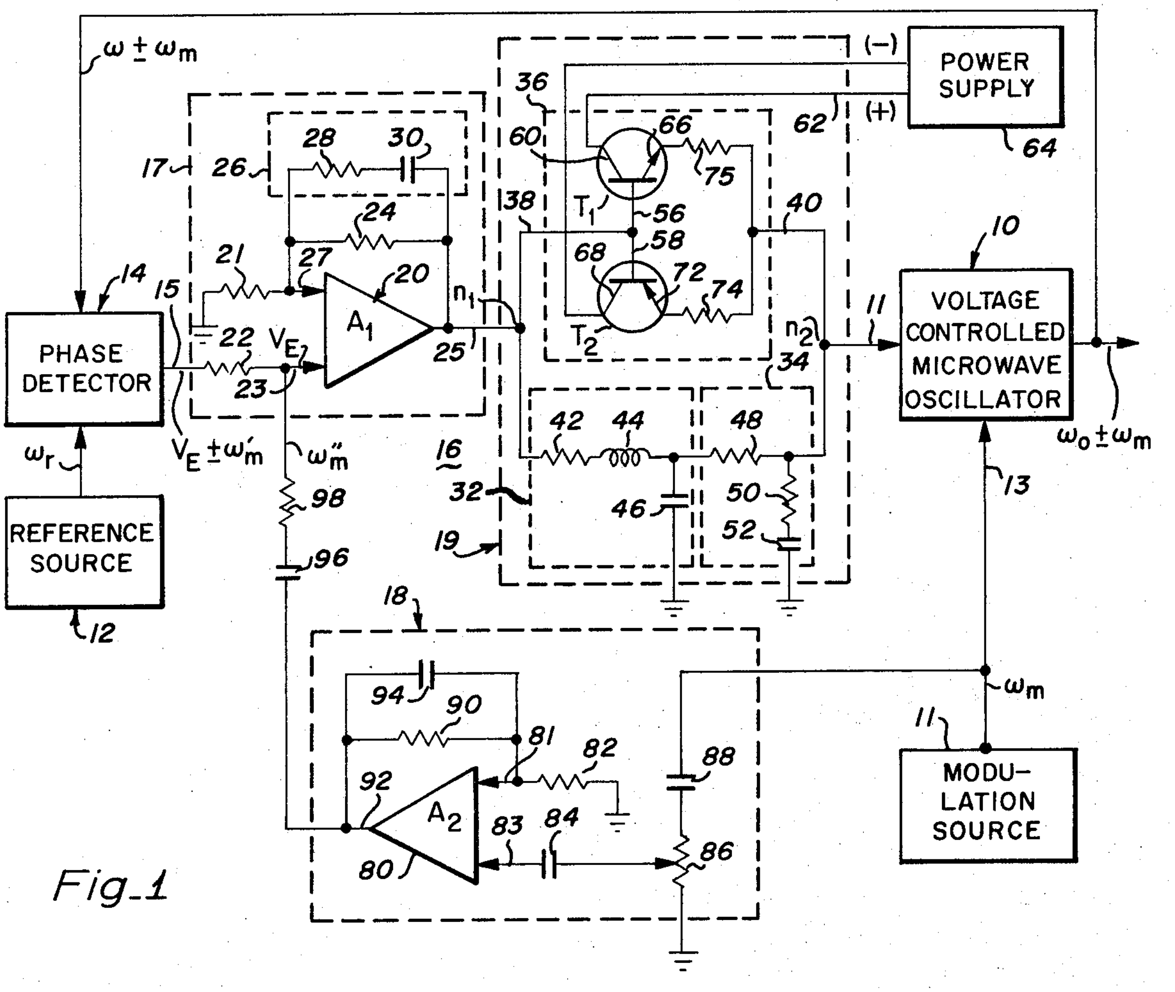
FIG. 1 is a schematic diagram illustrating a preferred embodiment of a dual bandwidth phase lock loop controlled microwave oscillator in accordance with the present invention.

Referring now to FIG. 1 of the drawing, an improved dual bandwidth phase lock loop control circuit is shown having means for removing intentional modulation impressed upon the controlled oscillator from the bandwidth expansion portion of the loop. The schematically illustrated preferred embodiment includes a voltage controlled microwave oscillator (VCMO) 10 for generating a modulated microwave signal $\omega_o \pm \omega_m$, a modulation source 11 for generating the modulation signal $\omega_m$, a reference source 12 for generating a fixed frequency reference signal $\omega_r$, a phase detector 14 for comparing the phase of the modulated output signal $\omega_o \pm\omega_m$ generated by oscillator 10 to the phase of the reference signal $\omega_r$ and developing an error signal including a DC component $V_E$ having a magnitude proportional to any phase difference and an AC component $\omega_m'$ corresponding to the modulation component $\omega_m$, a modulation cancelling circuit 18 for developing a modulation cancelling signal $\omega_m''$ for cancelling the modulation component $\omega_m'$ in the error signal developed by phase detector 14, and a dual bandwidth signal translating means 16 for coupling the DC error signal $V_E$ to the control input 11 of oscillator 10.

Oscillator 10 may take the form of any suitable voltage controlled or YIG-tuned oscillator which responds to a DC control signal applied to its control input terminal 11 to change the phase or frequency of its output signal $\omega_o$, and which may be modulated by a modulation signal $\omega_m$ input at terminal 13 to develop a modulated output signal $\omega_o \pm \omega_m$. In the preferred embodiment, VCMO 10 includes a dual diode cavity oscillator having a first tuning diode responsive to the error signal $V_E$, and a second tuning diode responsive to the modulation input signal $\omega_m$.

Phase detector 14 is preferably an apparatus of the type which samples the two signals input thereto and develops an error signal proportional to any difference in their phase. The error signal may be either DC or AC modulated DC and is substantially linear so long as the difference in phase between the oscillator signal and the reference signal does not approach ±90°. However, since the signal input from oscillator 10 includes a modulation component $\omega_m$, it will be appreciated that the error signal will also contain a modulation component $\omega_m'$ which must be removed so as not to interfere with the operation of the amplitude sensitive dual bandwidth signal translating circuit 16. As will be explained in more detail below, the modulation component $\omega_m'$ will be cancelled by the addition of a like signal $\omega_m''$ which is 180° out-of-phase with $\omega_m'$ and the resultant error signal $V_E$ will be input to the signal translating circuit 16.

Signal translating circuit 16 is comprised of an operational amplifier 17 and an adaptive control network 19. Op-amp 17 includes a high gain differential amplifier 20 having a first input terminal 23 connected through a resistor 22 to the output terminal 15 of phase detector 14, a second input terminal 27 coupled to circuit ground through a resistor 21, and an output terminal 25 connected to the adaptive control network 19. In addition, op-amp 17 includes a feedback resistor 24 connected between output terminal 25 and input terminal 27, and a low-pass roll-off filter circuit 26 comprised of a resistor 28 and capacitor 30 connected in series across resistor 24. Although op-amp 17 also provides roll-off attenuation, its primary purpose is to amplify the error signal $V_E$ to a level such that the desired control of oscillator 10 can be achieved. In an alternative embodiment, the roll-off filter circuit 26 could be eliminated or placed elsewhere in the circuit if desired.

Adaptive control network 19 is comprised of an out-of-band roll-off filter circuit 32, a low-pass filter circuit 34, and a voltage follower circuit 36. The function of filter circuits 32 and 34 are described in detail in my aforementioned co-pending application. Filter circuits 32 and 34 are connected in series between circuit nodes $n_1$ and $n_2$ while voltage follower circuit 36 has its input terminal 38 coupled to circuit node $n_1$ and its output terminal 40 coupled to circuit node $n_2$.

Filter 32 includes a resistor 42 and an inductor 44 connected in series, and a capacitor 46 coupling the output end of inductor 44 to circuit ground. Filter circuit 34 includes a low-pass RC filter comprised of a resistor 48 having one end connected to the output end of filter 32 and the other end coupled to ground through a series circuit including a resistor 50 and a capacitor 52. The filters 32 and 34 thus, except as explained below, serve to couple the output of op-amp 17 to the control input 11 of oscillator 10 and play a major role in determining the loop bandwidth as discussed in detailed in the aforementioned co-pending application.

Voltage follower circuit 36, in the preferred embodiment, includes a pair of transistors $T_1$ and $T_2$, and a pair of resistors 74 and 75. $T_1$ is an npn transistor having its base 56 coupled to terminal 38 and the base 58 of transistor $T_2$, its collector 60 coupled to the positive voltage terminal 62 of a power supply 64, and its emitter 66 coupled to terminal 40 through a current limiting resistor 75. $T_2$ is an pnp transistor having its base 58 coupled to terminal 38, its collector 68 coupled to the negative terminal 70 of power supply 64, and its emitter 72 coupled to terminal 40.

When a voltage exceeding the threshold potential of $T_1$ and $T_2$ appears at node $n_1$, and thus the input 38 of voltage follower 36, a voltage will be developed at the output 40, and thus node $n_2$, which is directly proportional to the voltage appearing at input 38. This being the case, it is apparent that the effect of filters 32 and 34 on the signal $V_E$ is effectively circumvented. Therefore the bandwidth reduction normally caused by filters 32 and 34 is also eliminated with the result being that the bandwidth of the loop is automatically expanded.

In order to remove the modulation component $\omega_m'$ from the phase detector output before it enters amplifier 20, the modulation cancelling circuit 18 is provided. Circuit 18 includes a differential amplifier 80 having a first input terminal 81 coupled to circuit ground through a resistor 82, and a second input terminal 83 coupled to the modulation source 11 through a coupling capacitor 84, a null adjustment potentiometer 86, and a DC isolation capacitor 88. A feedback resistor 90 is connected between input terminal 81 and output terminal 92 to set the DC gain of amplifier 80. A capacitor 94 is connected in parallel with resistor 90 and combines with resistor 82 to establish a 90° phase shift in the signal amplified by amplifier 80. Output terminal 92 is coupled to input terminal 23 of amplifier 20 through a capacitor 96 and a resistor 98 which prevent amplifier 80 from loading amplifier 20. The component values of the various circuit elements are selected to suit the particular application and frequencies involved.

Whereas frequency control loop circuitry imparts an approximate 90° lagging phase shift to the modulation component $\omega_m'$ at 23 as compared to $\omega_m$, at 13, circuit 18 imparts an approximate 90° leading phase shift to $\omega_m''$ at 23 as compared to $\omega_m$ at 13 so that when $V_E \pm \omega_m'$ and $\omega_m''$ are added together at terminal 23, the respective components $\omega_m''$ and $\omega_m'$ are 180° out-of-phase and thus cancel each other, leaving only the error signal $V_E$ for application to translating circuit 16.

Turning now to the overall operation of the above described apparatus, it will be appreciated that as in prior art circuits, even in the absence of the particular signal translating means 16 there will be a loop attenuation due to the frequency response characteristics of the various components in the loop. And since the subject apparatus is not a discriminator but is concerned with providing oscillator control for phase differences of less than ±90° between the signals developed by oscillator 10 and the reference source 12, it is desirable to attenuate as much as possible those extraneous noise signals which inadvertently appear in the loop. This is accomplished by means of the filter circuits 26, 32 and 34. The result, however, of reducing the loop bandwidth is to also reduct the control capability of the circuit. Although this does not make much difference so long as the control error is small, in instances of high loop stress it is desirable that as much control potential as possible be available. Accordingly, the voltage follower circuit 36 is provided to in effect by-pass the bandwidth reducing the filter circuits 32 and 34 and develop a voltage on node $n_2$ which is substantially identical to that appearing at node $n_1$. However, since voltage follower 36 is sensitive to error signal amplitude and the intentional modulation component $\omega_m$ is transmitted through detector 14 and appears in the gross error signal $V_E \pm \omega_m'$, it is apparent that unless the component $\omega_m'$ is removed from the error signal prior to its appearance at node $n_1$, it may cause voltage follower 36 to expand the loop bandwidth during periods when expansion is not required.

Elimination of the modulation component $\omega_m'$ from the error signal is thus accomplished by means of the circuit 18 which shifts the phase of the modulation signal $\omega_m$ developed at terminal 13 by 90° and inserts the resulting cancelling signal $\omega_m'$ into the loop input 23 to cancel the error signal modulation component $\omega_m'$. Cancellation of course occurs because the two modulation component derivatives are 180° out-of-phase with each other when added together at terminal 23. Potentiometer 86 permits the magnitude of the cancelling signal $\omega_m''$ to be matched to the modulation component $\omega_m'$ so as to cause complete cancellation. Any suitable means of calibration can be used to provide proper adjustment of potentiometer 86.

Figure 2:
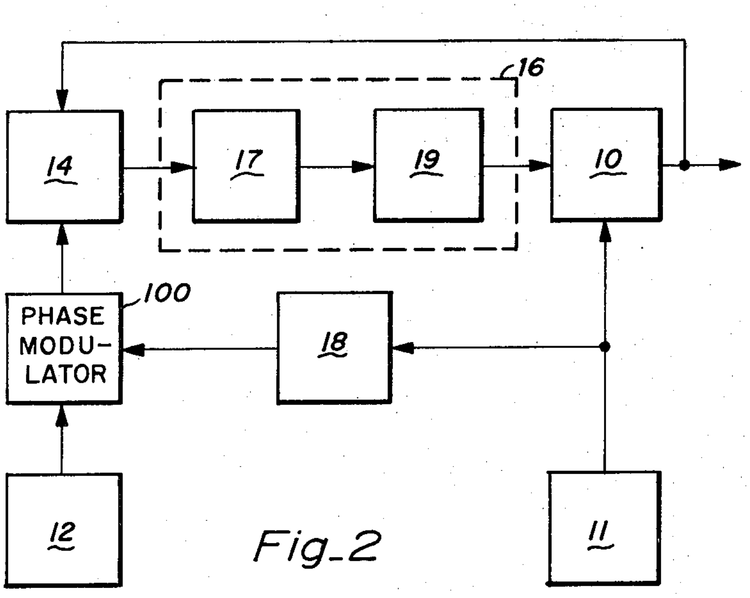
FIG. 2 is a block diagram illustrating an alternative embodiment of a dual bandwidth phase lock loop controlled microwave oscillator in accordance with the present invention.

Referring now to FIG. 2 of the drawing, an alternative embodiment of the present invention is shown wherein cancellation of the modulation component $\omega_m$ is achieved by modulating the reference signal $\omega_r$ generated by the reference source 12 instead of cancelling the modulation component $\omega_m'$ at the input to op-amp 17. The various components correspond to like numbered circuit components in FIG. 1. In this embodiment a phase modulator 100 is disposed between source 12 and phase detector 14. Modulator 100 is driven by the output of integrating circuit 18 so as to cause the cancellation to occur in the phase detector 14. This technique allows modulation at lower frequencies ($\omega_m$) since it is independent of $\omega_m$ and deviation.

Whereas the present invention has been defined in terms of a simplified illustrative example utilizing a particular cancellation circuit in combination with particular loop elements, it is contemplated that alternative embodiments of these several elements as well as their respective inter-relationships will become apparent to those skilled in the art after having read the foregoing disclosure. Accordingly, it is to be understood that the particular apparatus described is for purposes of illustration only and the appended claims are to be interpreted as covering all modifications and alterations that fall within the true spirit and scope of the invention.

What is claimed is:

1. A microwave source, comprising:

microwave oscillator means responsive to a control signal and a modulating signal and operative to develop a modulated output signal;

reference source means for developing a fixed frequency reference signal;

phase detecting means responsive to said output signal and said reference signal and operative to develop an error signal commensurate with any difference in phase between said reference signal and said output signal, said error signal including modulation components corresponding to said modulating signal;

a dual bandwidth signal translating means responsive to said error signal and operative to develop said control signal, said translating means completing a phase lock loop for controlling the frequency of said oscillator means, said translating circuit causing said loop to have a first bandwidth when the magnitude of said error signal is less than a predetermined threshold value and a second bandwidth when the magnitude of said error signal is greater than said threshold value; and modulation cancelling means responsive to said modulating signal and operative to develop a modulation cancelling signal which is 180° out-of-phase with said modulating component, said cancelling signal being added to said error signal at the input to said translating means for removing said modulation component from said error signal.

2. A microwave source as recited in claim 1 wherein said modulation cancelling means includes phase shifting means for shifting the phase of said modulating signal to develop said cancelling signal.

3. A microwave source as recited in claim 1 wherein said signal translating means includes, an operational amplifier for receiving said error signal and said cancelling signal and developing an amplified signal commensurate with the sum thereof, and an adaptive control network responsive to said amplified signal and operative to develop said control signal.

4. A microwave source as recited in claim 3 wherein said adaptive control network includes, filter means coupled between the output of said operational amplifier and the control signal receiving input of said microwave oscillator means, and a voltage follower means having an input terminal coupled to the output of said operational amplifier and an output coupled to the control input of said microwave oscillator means, said voltage follower means being responsive to amplified error signals exceeding a predetermined threshold and operative to develop control signals commensurate therewith, whereby said phase lock loop has a first bandwidth determined by said filter means when the amplified error signal is less than said threshold and has a second bandwidth independent of said filter means when the amplified error signal exceeds said threshold.

5. A microwave source as recited in claim 4 wherein said filter means includes an out-of-band filter and a low-pass filter connected in series between the output of said operational amplifier and the control input of said microwave oscillator means.

6. In a microwave source including a modulatable voltage controlled microwave oscillator for developing a modulated output signal and a dual bandwidth phase lock loop for controlling said oscillator, the loop including a phase detector for developing an error signal and a signal translating circuit responsive to the magnitude of the error signal and operative to change the bandwidth of said loop commensurate therewith and to develop an oscillator control signal, the improvement comprising, modulation cancelling means for developing a modulation cancelling signal for insertion into said loop between said phase detector and said signal translating circuit to cancel any modulation components appearing in said error signal.

7. In a microwave source as recited in claim 6 wherein said modulation cancelling means includes a phase shifting means having input means for receiving the modulation signal applied to said microwave oscillator and output means coupled to the input of said signal translating circuit, said phase shifting means being operative to shift the phase of said modulating signal so that said cancelling signal is 180° out-of-phase with the modulation component of said error signal.

8. A microwave source, comprising:

a voltage controlled microwave oscillator having a first input terminal for receiving a control signal, a second input terminal for receiving a modulating signal and an output terminal at which a modulated microwave signal is generated;

modulating means for developing said modulating signal for input to said second input terminal;

a phase lock loop including a phase detector for comparing said modulated micorwave signal to a reference signal and developing an error signal commensurate with the difference therebetween, said error signal including modulation components corresponding to said modulating signal, and adaptive means responsive to said error signal and operative to develop a control signal for input to said first input terminal, said adaptive network being further operative to automatically change the loop bandwidth in response to the magnitude of said error signal to increase the control capability of said loop;

modulation cancelling means responsive to said modulating signal and operative to develop a modulation cancelling signal; and means for adding said error signal and said modulating cancelling signal to cancel said modulation component before said error signal is introduced into said adaptive control network.

9. A microwave source as recited in claim 8 wherein said modulation cancelling means includes a phase shifting means for shifting the phase of said modulating signal so that it is 180° out-of-phase with said modulation component.

10. A microwave source as recited in claim 8 wherein said adaptive control network includes filter means normally coupling said error signal to said first control input terminal and causing said control loop to have a relatively narrow loop bandwidth, and voltage follower means responsive to said error signal and operative to by-pass said filter means and develop a control signal at said first input terminal when said error signal exceeds a predetermined threshold thereby causing said loop to have a relatively wide loop bandwidth.

11. A microwave source, comprising:

a voltage controlled microwave oscillator having a first input terminal for receiving a control signal, a second input terminal for receiving a modulating signal and an output terminal at which a modulated microwave signal is generated;

means for developing said modulating signal for input to said second input terminal;

a phase lock loop including a phase detector for comparing said modulated microwave signal to a reference signal and developing an error signal commensurate with any difference therebetween, an adaptive network responsive to said error signal and operative to develop a control signal for input to said first input terminal, said adapative network being further operative to automatically change the loop bandwidth in response to the magnitude of said error signal to increase the control capability of said loop;

means responsive to said modulating signal and operative to develop a modulation cancelling signal; and reference signal generating means responsive to said modulation cancelling signal and operative to develop said reference signal.

* * * * *